US012780039B2

(12) United States Patent
Bays et al.

(10) Patent No.: US 12,780,039 B2
(45) Date of Patent: Nov. 3, 2026

(54) AUTOMATIC DISCHARGE OF DAMAGED BATTERIES IN ELECTRIC VEHICLES

(71) Applicant: Cummins Inc., Columbus, IN (US)

(72) Inventors: Mark N. Bays, Columbus, IN (US); Chetan Ponnathpur, Columbus, IN (US)

(73) Assignee: Cummins Inc., Columbus, IN (US)

( * ) Notice: Subject to any disclaimer, the term of this patent is extended or adjusted under 35 U.S.C. 154(b) by 804 days.

(21) Appl. No.: 18/111,310

(22) Filed: Feb. 17, 2023

(65) Prior Publication Data

US 2023/0278462 A1 Sep. 7, 2023

Related U.S. Application Data

(60) Provisional application No. 63/316,737, filed on Mar. 4, 2022.

(51) Int. Cl.

*H02J 7/00* (2026.01)
*B60L 3/00* (2019.01)
*B60L 58/14* (2019.01)
*H02J 7/14* (2006.01)

(52) U.S. Cl.

CPC ............. *B60L 58/14* (2019.02); *B60L 3/0046* (2013.01); *B60L 2240/545* (2013.01); *B60L 2240/547* (2013.01)

(58) Field of Classification Search

CPC .......... B60L 58/14; B60L 3/0069; B60L 3/04; B60L 3/0023; B60L 3/0046
USPC .......................................................... 320/132
See application file for complete search history.

(56) References Cited

U.S. PATENT DOCUMENTS

| | | | | |
|---|---|---|---|---|
| 6,504,344 | B1 * | 1/2003 | Adams | B60L 3/12 320/132 |
| 8,450,975 | B2 | 5/2013 | Kim | |
| 10,411,482 | B2 | 9/2019 | Greenwood et al. | |
| 10,500,962 | B2 * | 12/2019 | Kinoshito | B60L 58/14 |
| 2010/0097211 | A1 | 4/2010 | Silver et al. | |

(Continued)

FOREIGN PATENT DOCUMENTS

DE 102013204520 A1 9/2014

*Primary Examiner* — Alexis B Pacheco
(74) *Attorney, Agent, or Firm* — Foley & Lardner LLP

(57) ABSTRACT

Computer-implemented technology for identifying or determining potentially damaged batteries in an electrical machine system, and for discharging the potentially damaged batteries. Embodiments include determining potentially damaged batteries by monitoring and determining information representative of one or more electrical or mechanical or thermal conditions of the batteries. The conditions may include isolation faults internal to the batteries, isolation faults external to the batteries, liquid or other contamination of the batteries, and other parameters such as out-of-specification temperatures, pressures, voltages and current levels of the batteries. Embodiments include determining whether to discharge potentially damaged batteries based on one or more of the electrical or mechanical or thermal conditions of the damaged batteries. For example, the computer-implemented technology may determine to not discharge a potentially damaged battery if parameters of the battery indicate that possible hazards or risks may be present based on certain parameters of the battery.

20 Claims, 4 Drawing Sheets

(56) References Cited

U.S. PATENT DOCUMENTS

| | | | | |
|---|---|---|---|---|
| 2011/0057622 | A1 | 3/2011 | Kim | |
| 2013/0106362 | A1 | 5/2013 | Mackintosh | |
| 2014/0070772 | A1 | 3/2014 | Andres | |
| 2020/0062138 | A1* | 2/2020 | Smolenaers | B60L 53/53 |
| 2020/0127469 | A1* | 4/2020 | Haindl | H01M 16/003 |
| 2020/0152938 | A1* | 5/2020 | Winger | B60L 58/19 |
| 2020/0298722 | A1* | 9/2020 | Smolenaers | B60L 53/24 |
| 2022/0115878 | A1* | 4/2022 | Khozikov | H02J 7/62 |
| 2023/0110889 | A1* | 4/2023 | Kong | B60W 20/20<br>701/22 |
| 2023/0261331 | A1* | 8/2023 | Morton | B60L 50/64<br>429/163 |

* cited by examiner

AUTOMATIC DISCHARGE OF DAMAGED BATTERIES IN ELECTRIC VEHICLES

REFERENCE TO RELATED APPLICATION

This application claims the benefit of U.S. Application No. 63/316,737, filed Mar. 4, 2022 and entitled Automatic Discharge of Damaged Batteries In Electric Vehicles, which is incorporated herein by reference in its entirety for all purposes.

FIELD

This disclosure relates generally to battery-powered electric machines such as electric vehicles. In particular, this disclosure relates to systems and methods for controlling the discharge of batteries in the event of faults or damage to the batteries.

BACKGROUND

Electric machine systems, such as for example electric vehicles (EV), include one or more batteries as a power source. Lithium ion batteries are examples of the types of batteries that may be used in such electric machines.

The batteries in the electric machines may on occasion not operate properly. Degradation of the functionality of batteries may, for example, be caused by external factors or events (e.g., mechanical shocks such as those that might be produced during a vehicle accident, or liquid contamination from the failure of the batteries' cooling systems), or internal faults or failures (e.g., degradation of internal dielectric capability). Potentially damaged batteries may present hazards or other risks, especially when they are still charged to levels within their operating voltage ranges.

There remains a continuing need for methods and systems for mitigating possible hazards or risks presented by damaged batteries. In particular, there is a need for such systems and methods that can accurately determine when a battery is damaged, and to effectively minimize hazards or risks that might otherwise be presented by the damaged batteries.

SUMMARY

Disclosed aspects include computer-implemented methods, computer systems and associated programmed computer-readable media with stored instructions for identifying or determining potentially damaged batteries in an electrical machine system, and for discharging the potentially damaged batteries. Embodiments may include determining potentially damaged batteries by monitoring and determining information representative of one or more electrical or mechanical or thermal conditions of the batteries. Nonlimiting examples of such conditions include isolation faults internal to the batteries, isolation faults external to the batteries, liquid or other contamination of the batteries, and other parameters such as out-of-specification temperatures, pressures, voltages and current levels of the batteries. Embodiments include determining whether to discharge potentially damaged batteries based on one or more of the electrical or mechanical or thermal conditions of the damaged batteries. For example, the methods, computer systems and computer-readable media may determine to not discharge a potentially damaged battery if parameters of the battery indicate that possible hazards or risks may be present based on certain parameters of the battery. Exemplary electrical machine systems include electric vehicles with electric traction motors.

One example is a computer-implemented method for operating an electrical machine system including one more batteries powering one or more electric machines. Embodiments may comprise (1) receiving, by one or more processors, fault information representative of an isolation fault condition of a first of the one or more batteries; (2) receiving, by one or more processors, battery condition information representative of one or more electrical or mechanical or thermal conditions of the first battery; (3) determining, by one or more processors in response to the isolation fault condition, whether to discharge the first battery based upon the battery condition information; and (4) causing, by one or more processors, the first battery to operate in a discharge mode when it is determined to discharge the first battery.

In some embodiments of the method, receiving the fault information includes receiving fault information representative of an isolation fault inside the first battery. In these and other embodiments the battery condition information may include information representative of one or more of coolant contamination, temperature, pressure or voltage.

In some embodiments of the method, determining whether to discharge the first battery includes determining, based upon the battery condition information, whether potentially hazardous battery discharge conditions exist. In these and other embodiments, for example, determining whether to discharge the first battery may include determining to not discharge the first battery when the battery condition information is representative of one or more of (1) coolant contamination in the first battery, (2) a temperature of the first battery is representative of a potential thermal runaway condition, (3) a voltage of the first battery is representative of a potential over-discharge condition, or (4) a pressure or temperature of the first battery is representative of a potential fire.

In some embodiments of the method, causing the battery to operate in the discharge mode may comprise causing the battery to discharge to a level at which the battery can be accessed and transported without or with reduced potential hazards. In these and other embodiments, for example, causing the first battery to operate in the discharge mode may comprise causing the first battery to discharge to a level lower than a predetermined operating range or level, and optionally about zero volts.

In some embodiments, the method may further comprise receiving, by one more processors, isolation integrity information representative of isolation integrity of at least portions of the electrical machine system external to the first battery; and determining whether to discharge the first battery may include determining, by one or more processors in response to the isolation fault condition, whether to discharge the first battery based upon the battery condition information and the isolation integrity information. In these and other embodiments, for example determining whether to discharge the first battery may include determining to not discharge the first battery when the isolation integrity information is representative of an isolation fault of the electrical machine system external to the first battery.

In some embodiments, the method may further comprise causing, by one or more processors, one or both of (1) a notification of the battery discharge mode operation to be presented to an operator of the machine system, or (2) disablement of the machine system, when it is determined to discharge the first battery. In some embodiments, the method may further comprise causing, by the one or more processors, one or both of (1) a notification of completion of the battery discharge mode operation to be presented to an operator of the machine system, or (2) enablement of the machine system by one or more others of the one or more batteries, upon completion of the discharge mode operation for the first battery.

In some embodiments of the method, causing the first battery to operate in the discharge mode comprises causing the first battery to be coupled to a resistive load of the machine system. As nonlimiting examples, causing the first battery to operate in the discharge mode may comprise causing the first battery to be coupled to an accessory component of the machine system that has functionality in the machine system in addition to use during the discharge mode operation.

As noted above, for example, in embodiments the electric machine includes an electric motor. In embodiments the electric machine is a traction motor of an electric vehicle. In some embodiments, causing the first battery to operate in a discharge mode comprises causing the first battery to be coupled to an accessory component, optionally a heater, of the electric vehicle.

Another example is a computer system for operating an electric machine system including one or more batteries powering an electric machine, wherein the electric machine system is optionally an electric vehicle including one or more electric traction motors, comprising (1) one or more processors; and (2) a program memory coupled to the one or more processors and storing executable instructions that when executed by the one or more processors cause the computer system to operate the electric machine system in accordance with any of the methods described above.

Another example is a tangible, non-transitory computer-readable medium storing executable instructions for operating an electric machine system, optionally an electric vehicle including one or more electric traction motors, that when executed by at least one processor of a computer system, causes the computer system to operate the electric machine system in accordance with any of the methods described above.

DETAILED DESCRIPTION

Figure 1:
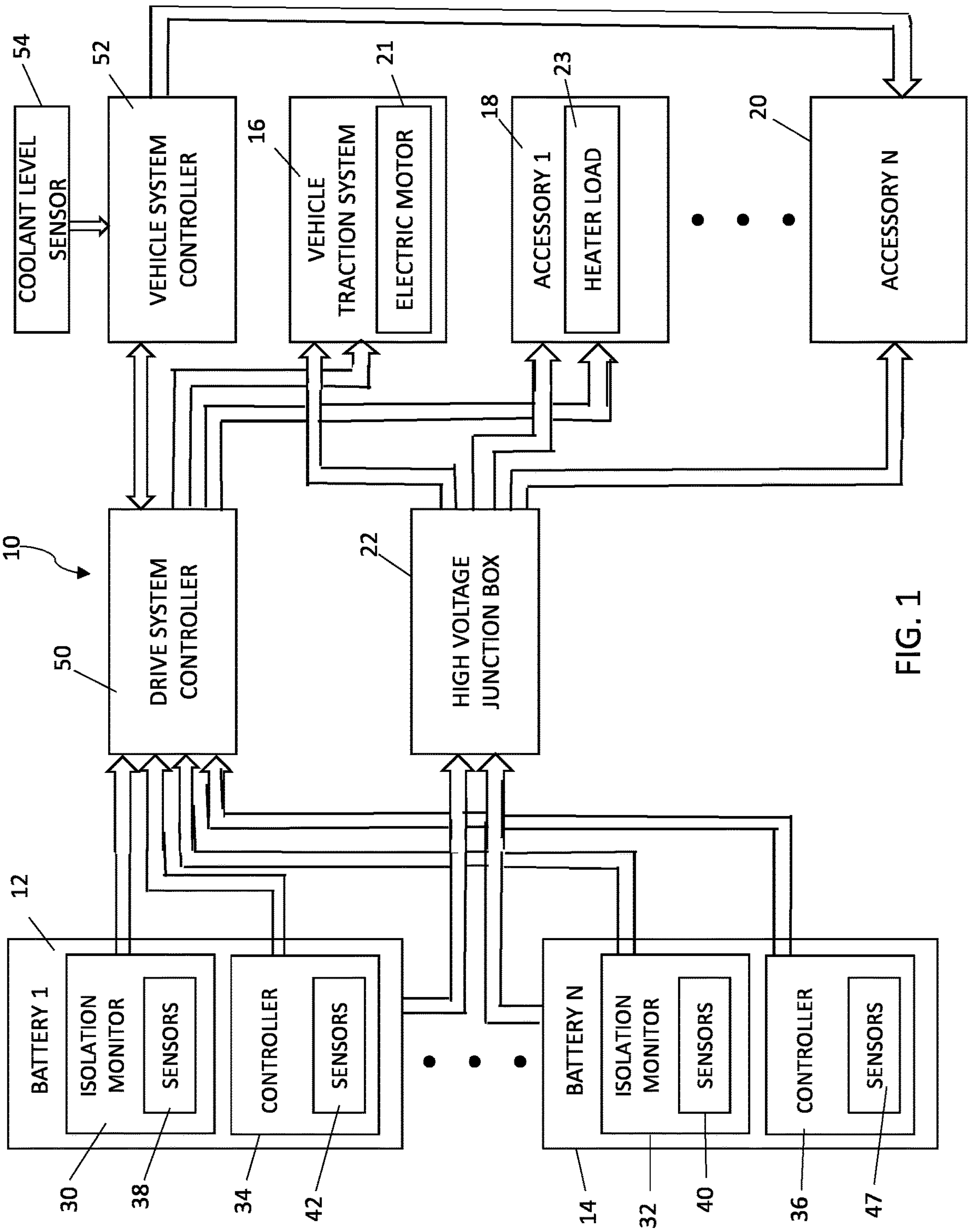
FIG. 1 is a diagrammatic illustration of an electric motor system of an electric vehicle, in accordance with embodiments.

FIG. 1 is a diagrammatic illustration of functional components of an electric machine system 10 in accordance with embodiments. Although other applications are contemplated in other embodiments, FIG. 1 illustrates the electric machine system 10 configured for use in an electric vehicle. The illustrated embodiments of the machine system 10 include batteries 12 and 14 that provide electric power to loads or other components of the machine system, such as for example the vehicle traction system 16 and accessories such as 18 and 20. The batteries 12 and 14 are coupled to the vehicle traction system 16 and accessories 18 and 20 through a high voltage junction box 22. The traction system 16 includes one or more electric motors 21. In the illustrated embodiments the accessory 18 is a cab heater of the vehicle, and includes a resistive load 23. Batteries 12 and 14 include isolation monitors 30 and 32, and controllers 34 and 36, respectively. Each of the isolation monitors 30 and 32 includes one or more sensors 38 and 40, respectively. Each of the controllers 34 and 36 includes one or more sensors 42 and 44, respectively. As described in greater detail below, a drive system controller 50 is coupled to receive data or information representative of parameters of the batteries 12 and 14 and other features of the electrical system 10 external to the batteries from the isolation monitors 30, 32 and the controllers 34, 36, respectively. A vehicle system controller 52 is coupled to coolant level sensor 54 that provides information representative of the level of coolant in a cooling system (not shown) configured to cool the batteries 12 and 14. The coolant level information, which may be representative of coolant leaking onto or into the batteries 12 or 14, is coupled to the drive system controller 50 via the vehicle system controller 52 in the illustrated embodiments. In other embodiments the coolant level sensor 54 may be coupled to the drive system controller 50 directly or via other communication paths. Vehicle system controller 52 is coupled to one or more components of the electrical system 10, such as the accessory 20 in the illustrated embodiments, and controls the application of power from the batteries 12 and 14 to the accessories (e.g., turns the accessory 20 On and Off). In the illustrated embodiments the drive system controller 50 is coupled to one or more components of the machine system 10 such as the vehicle traction system 16 and accessory 18, and controls the application of power from the batteries 12 and 14 to the components (e.g., turns the electric motors 21 and/or heater load 23 On and Off).

As described in greater detail below, the electric machine system 10 is configured to monitor one or more operating characteristics of the batteries 12 or 14, such as for example one or more mechanical, electrical or thermal characteristics of the batteries, to identify conditions indicating that one or more of the batteries is not operating properly. In embodiments, the electric machine system 10 monitors the batteries 12 or 14 to determine whether one or more of the batteries may potentially present a hazard or other risk, for example a relative degree of hazard or risk that may not be present if the battery is operating according to its normal or otherwise in-specification operating conditions. For example, degradation of the functionality of batteries may be caused by external factors or events (e.g., mechanical shocks such as those that might be produced during a vehicle accident, or liquid contamination from the failure of the batteries' cooling systems), or internal faults or failures (e.g., degradation of internal dielectric capability). Potentially damaged batteries exhibiting these characteristics may present such hazards or other risks, especially when they are still charged to levels within their normal operating voltage ranges. Terms such as "damage" and "damaged" are used herein to refer to batteries that may have faults or otherwise degraded characteristics of these types.

Figure 2:
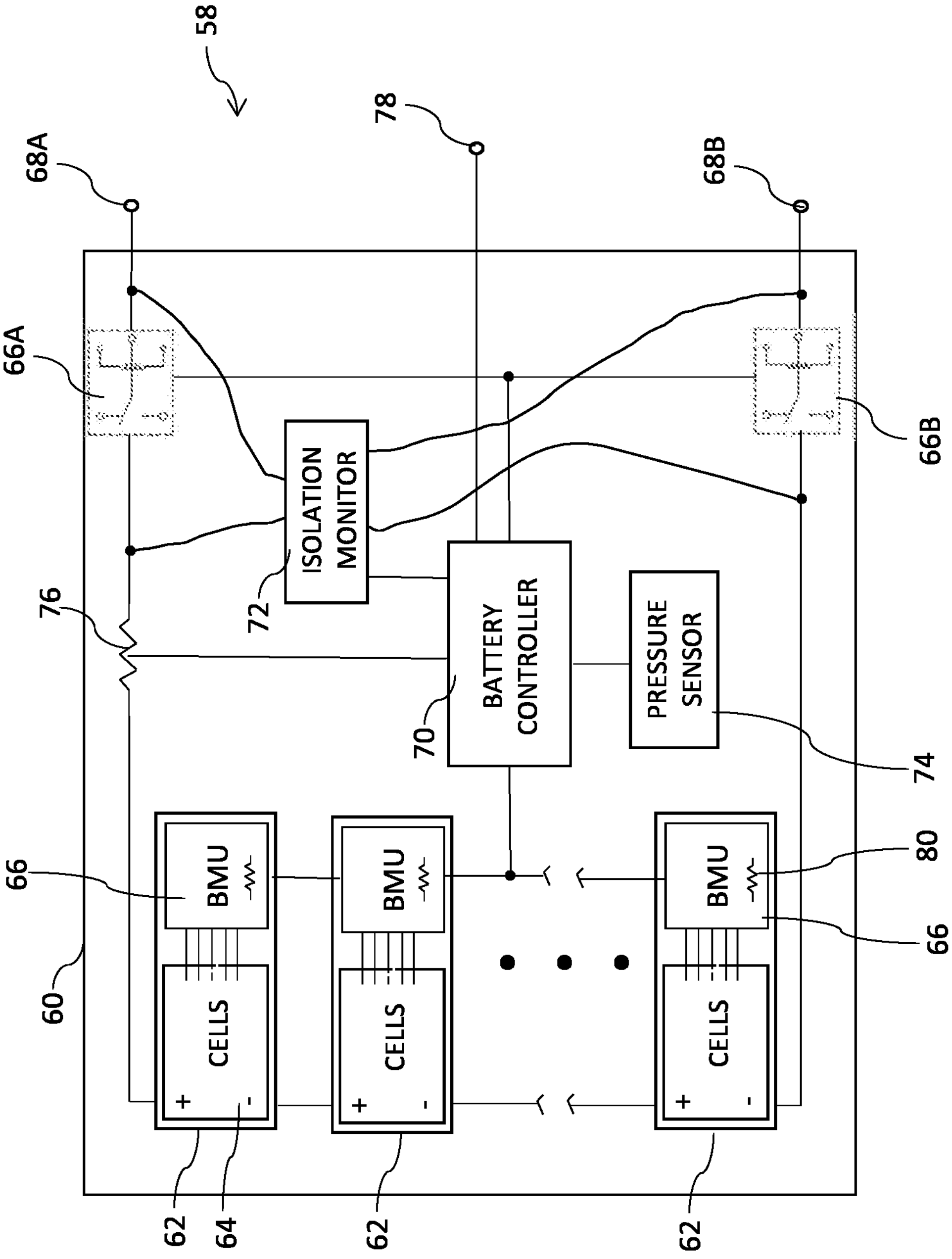
FIG. 2 is a diagrammatic illustration of a battery, in accordance with embodiments.

FIG. 2 is a diagrammatic illustration of an exemplary battery 58 in accordance with embodiments. As shown, the battery 58 includes an enclosure 60 and a plurality of modules 62 within the enclosure. Although three modules 62 are shown for purposes of example in FIG. 2, other embodiments have fewer or more modules. Each module 62 include cells 64 and a battery monitoring unit (BMU) 66. As shown, the cells 64 are electrically coupled in a series arrangement to provide the operating voltage of the battery 58 (e.g., the positive and negative terminals of adjacent cells are connected to one another). In embodiments, for example, each cell 64 may provide a potential of less than about fifty volts, and the battery 58 includes sufficient modules 62 to provide an output voltage in a range of seven hundred volts. Other embodiments include other numbers of modules 62 having cells 64 that provide other voltages. Other embodiments of battery 58 have other output voltages. The positive and negative terminals on the opposite ends of the series-connected cells 64 are coupled to contactors 66A and 66B, respectively. The contactors 66A and 66B are controllable switches configured to controllably couple the positive and negative terminals of the series-connected arrangement of cells 64 to positive and negative terminals 68A and 68B, respectively, of the battery 58.

The BMUs 66 are coupled to a battery controller 70. The battery controller 70 is coupled to the contactors 66A and 66B. BMUs 66 are electronic components configured to measure parameters such as voltages and temperatures of the associated cells 64, and to provide information representative of the measured parameters to the battery controller 70. As shown diagrammatically in FIG. 2, the BMUs 66 are connected via a harness to individual nodes between associated cells 64, enabling the BMUs to monitor cell voltages individually and to communicate information representative of the measured voltages to the battery controller 70. BMUs 66 may include sensors such as thermistors (not separately shown in FIG. 2) positioned to monitor temperatures of individual cells 64, and to communicate information representative of the measured temperatures to the battery controller 70.

Isolation monitor 72 is coupled to the battery controller 70 in the embodiments shown in FIG. 2. As shown, the isolation monitor 72 is coupled to the opposite sides of each of the contactors 66A and 66B (described below). For example, when the contactors 66A and/or 66B are switched to their electrically open states, isolation monitor 72 may measure and determine external connection resistances between the electrical conductors to which it is coupled, such as for example the terminals 68A and 68B, and the chassis of the battery 58 (such as for example the enclosure 60) which may be coupled to a ground potential with respect to the terminals 68A and 68B, to identify possible isolation faults (e.g., external isolation faults in portions of the electrical system or the vehicle to which the battery 58 is connected. When the contactors 66A and/or 66B are switched to their electrically closed states, isolation monitor 72 may measure and determine connection resistances between the terminals 68A and 68B at all portions of the electrical system of the vehicle, including isolation faults that may occur within the battery 58 (e.g., resistances representative of internal isolation faults in the form of connections between the cells of the battery and its enclosure 60) Isolation monitor 70 may identify and distinguish such internal (e.g., to the battery 58) isolation faults and such external (e.g., portions of the electrical system outside of the battery) isolation faults by comparing the measured connection resistances determined when the contactors 66A and 66B are in their open states to the measured connection resistances determined when the contactors are in their closed states. Information representative of isolation faults identified or determined by the isolation monitor 72 may be coupled to the battery controller 70. In yet other embodiments isolation faults may be determined or identified by the battery controller 70 based on information provided by the isolation monitor.

Battery controller 70 is coupled to a pressure sensor 74 and other components such as for example shunt resistor 76 to receive information representative of parameters of the battery 58 in the illustrated embodiments. Via the connection to the shunt resistor 76, battery controller 70 may determine information representative of current flow within and being produced by the battery 58. Pressure sensor 74 provides information representative of pressures, such as air or other gases, within the battery 58. Battery parameter information, including the types of information described above that are determined or received by the battery controller 70, may be coupled by the battery controller to other components of the electrical machine system 10 via terminal 78. In embodiments, for example, the battery controller 70 may be coupled to the drive system controller 50 (FIG. 1). Embodiments of the battery controller 70 are also configured to process the battery parameters it receives from components such as BMUs 66, isolation monitor 72, pressure sensor 74 and resistor 76, and to identify or otherwise determine faults or other damage or potential damage conditions of the battery 58 or other portions of the electric machine system 10 external to the battery, and to communicate information representative of such damage conditions to other components of the electrical machine system 10. For example, the battery controller 70 may identify faults in the battery 58 or other components of the machine electrical system 10, and communicate information representative of such determined faults to the drive system controller 50 (FIG. 1).

Battery controller 70 is also coupled to the contactors 66A and 66B, and is configured to control the contactors (e.g., to switch On and Off) and thereby control the electrical connections of the battery modules 62 to the terminals 68A and 68B of the battery 58. Connections of either or both of the terminals 68A or 68B to other components of the electrical machine system 10 can thereby be opened and closed. In embodiments, the battery controller 70 controls one or both of the contactors 66A or 66B based on determinations of faults or other damage made by the battery controller. Additional or alternatively, the battery controller 70 actuates one or both of the contactors 66A or 66B based on controls signals received by the battery controller from other components of the electrical machine system 10 such as the drive system controller 50. For example, the battery controller 70 may implement algorithms and methods to monitor parameter data received by the battery controller, and to compare data to threshold limits to identify faults or other potential damage. The battery controller 70 may use such determined damage conditions to control (e.g., to switch Off and electrically open) one or more of the contactors 66A or 66B, or communicate such damage conditions to other components of the machine electrical system 10.

Embodiments of battery 58 may also include cell balancing resistors 80. In the illustrated embodiments the cell balancing resistors 80 are shown as components of the BMUs 66, and may include one such cell balancing resistor per cell node. The cell balancing resistors 80 may be arranged with switches (not shown in FIG. 2), allowing them to be controllably switched across the terminals of individual cells 64 (e.g., by the battery controller 70) to discharge the associated cells on the node. Generally, to enable the battery 58 to provide optimum performance, cells 64, and preferably all the cells, should have a similar state of charge or charge level. For example, if one cell 64 is at a higher state of charge than other cells 64, the usable capacity of the battery 58 may be decreased due to limitations of not over-charging the highest state-of-charge (SOC) cell, and not undercharging others of the cells. Battery controller 70 may monitor for conditions of these types, and switch the cell balancing resistors 80 to discharge the higher SOC cells down to a range similar to the SOC of other cells. Cell balancing resistors 80 may be configured to discharge at relatively slow rates to minimize heat dissipation and to enhance cell SOC balancing accuracy. In some embodiments, cell balancing resistors 80 are not used as loads for purposes of discharging batteries such as 12 or 14 during damaged battery discharge mode operations described below in connection with method 100.

Figure 3:
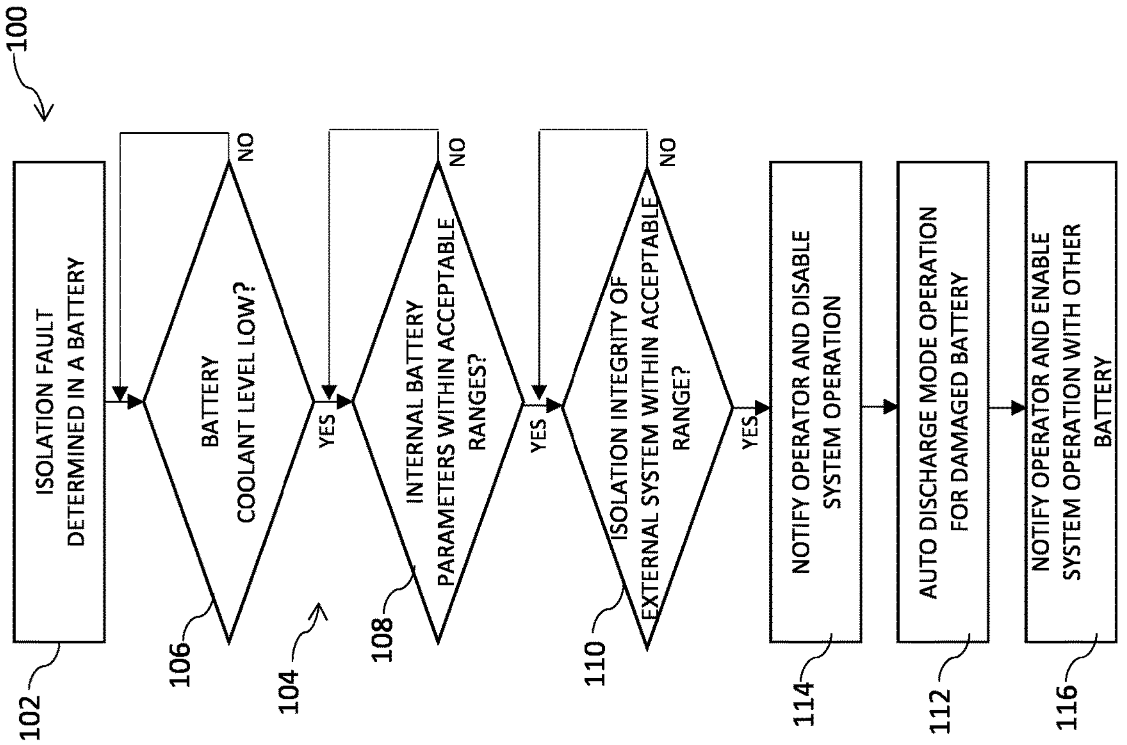
FIG. 3 is a diagrammatic illustration of a damaged battery determination and discharge method, in accordance with embodiments.

FIG. 3 is a diagrammatic illustration a method 100 that can be performed by the electric machine system 10 to identify or determine one or more of the batteries such as 12 or 14 that are potentially damaged, and to determine whether to automatically discharge a potentially damaged battery to a level that may reduce any hazards or risks that may be associated with the battery. By the method 100, a battery such as 12 or 14 determined to be potentially damaged, and to not present certain hazards or risks, may be discharged. Method 100 may include additional steps, such as for example notifying an operator of the electric machine system 10 of actions that may occur in connection with the electric machine system. In embodiments, the method 100 may be performed by the drive system controller 50 in combination with one or more other components of the electrical machine system 10.

At step 102 the method 100 determines whether one or more of the batteries such as 12 or 14 has an electrical isolation fault. In embodiments, method 100 determines whether each of the batteries such as 12 or 14 of the electrical machine system 10, or a cell within the batteries, has an isolation fault. For example, the method 100 may determine whether one of the batteries 12 or 14 has in internal isolation fault. Information received from the isolation monitor 30, 32 or controller 34, 36 of the batteries 12 or 14, respectively, may for example be monitored to determine an isolation fault in the battery at step 102. An isolation fault determined at step 102 may represent a damage condition of the battery such as 12 or 14.

At step 104, the method 100 determines whether a battery such as 12 or 14 is potentially damaged. For example, at step 104 the method 100 may determine whether one or more of the batteries such as 12 or 14 has one or more electrical, mechanical or thermal conditions that may indicate that the battery is damaged. Examples of potential damage conditions that can be determined at step 104 include liquid contamination of the battery 12 or 14, which might occur, for example due to faults in the battery cooling system that cause undesired exposure of internal or external portions of the battery to coolant, and/or operating parameters such as temperatures, voltages, currents and/or pressures that are outside of normal operating specification values or ranges. In the illustrated embodiments, method 100 performs step 104 after an isolation fault is determined at step 102, and electrical conditions that may be monitored to determine a potentially damaged battery at step 104 do not include determining an isolation fault of the type determined at step 102. In other embodiments isolation faults may be determined in connection with step 104. For example, in embodiments the step 104 is performed on batteries such as 12 or 14 determined at step 102 to have an isolation fault condition. In other embodiments the step 104 is periodically performed on all batteries such as 12 or 14.

The illustrated embodiments of step 104 include steps 106 and 108. At step 106, the method 100 determines whether a coolant level associated with the battery such as 12 or 14 is low. The determination at step 106 may, for example, be representative of a battery such as 12 or 14 that is contaminated by coolant. In other embodiments other approaches (e.g., fluid sensors) may be used to determine liquid contamination of a battery such as 12 or 14. In the illustrated embodiments, method 100 may continue to monitor the battery coolant level when a low level is not determined. Method 100 continues to step 108 when low battery coolant level is detected at step 106 in the illustrated embodiments. In effect, by the illustrated embodiments, method 100 determines not to discharge the battery if a low coolant level is not determined at step 106. If a low coolant level is determined at step 106, method 100 evaluates other conditions of the battery to determine whether to discharge the battery. In effect, by the illustrated embodiments, method 100 determines to conditionally discharge the battery when a low coolant level is identified.

At step 108, method 100 determines whether one or more internal parameters of the battery such as 12 or 14 (e.g., a battery determined to be potentially damaged) is within certain values or ranges. For example, at step 108 the method 100 may determine whether one or more internal parameters of the battery such as 12 or 14 are at levels that will allow the battery to be discharged without presenting potentially relatively hazardous or risky conditions during the discharge operation. In aspects, for example, method 100 may monitor and determine whether temperatures of the batteries such as 12 or 14 are within acceptable levels or ranges. Elevated temperatures in a battery may, for example, cause exothermic reactions that put the battery in a state sometimes referred to as thermal runway that may present hazards or risks relating to fire. Discharging a battery may increase the temperature of the battery due to heating from internal resistance. Such temperature increases may be minimal under normal operating conditions or specifications of a battery, and not cause hazard or risk conditions. However, if damage to a battery or other battery conditions have caused a temperature of the battery to be elevated to certain temperatures near temperatures representative of thermal runaway, or that may cause thermal runaway, method 100 may determine that it is not advisable to discharge the battery, and to not perform a discharge operation. In embodiments, because of ambient temperatures or other natural cooling, the method 100 may continue to monitor the temperature of the battery to determine whether the battery cools to temperatures at acceptable values or ranges to enable discharge of the battery.

In additional or alternative aspects, at step 108 method 100 may monitor and determine whether pressures of the batteries such as 12 or 14 are within acceptable levels or ranges. Elevated pressure of a battery may be an indication that the battery, or a portion thereof, is generating gases and may be representative of a thermal runaway condition. For reasons similar to those discussed above, further discharge of the battery may exacerbate the potential hazard or risk situation. In embodiments, the method 100 may continue to monitor the pressure of the battery to determine whether the pressure reduces to levels at acceptable values or ranges to enable discharge of the battery.

In additional or alternative aspects, at step 108 method 100 may monitor and determine whether voltages or currents of the batteries such as 12 or 14 are within acceptable levels or ranges. Voltage or currents outside of certain values or ranges may represent damage to the battery or to the load (e.g., electric motor 21 and/or heater load 23 shown in FIG. 1) to which the battery is connected. Method 100 may determine that it is not advisable to discharge the battery, and to not perform a discharge operation, if such voltage or current levels of the battery are outside of acceptable values or ranges (e.g., an over-discharge condition). In embodiments, the method 100 may continue to monitor the voltages or currents of the battery to determine whether the voltages or currents reduce to levels at acceptable values or ranges to enable discharge of the battery.

As shown in FIG. 3, step 108 may continue if one or more of the monitored parameters of the battery are not at acceptable values or within acceptable ranges. In effect, by the illustrated embodiments, method 100 determines not to discharge the battery such as 12 or 14 if any of the monitored parameters are not at acceptable values or within the acceptable ranges. By the illustrated embodiments, method 100 determines to conditionally discharge the battery when the monitored parameters are determined to be within the acceptable values or ranges at step 108.

At step 110, method 100 determines or verifies the isolation integrity of components of the electrical machine system 10 external to the battery such as 12 or 14. In embodiments, for example, the isolation integrity of external components of the electrical machine system 10 may be determined by information received from isolation monitors such as 30 and 32 of batteries 12 and 14, respectively. Method 100 may determine that it is not advisable to discharge the battery, and to not perform a discharge operation, if portions or the electrical machine system 10 external to the batteries such as 12 or 14 do not exhibit appropriate isolation integrity (e.g., are outside or acceptable values or ranges). As shown in FIG. 3, step 110 may continue if isolation integrity is not determined at the step. In effect, by the illustrated embodiments, method 100 determines not to discharge the battery if isolation integrity of external components is not within the acceptable ranges. By the illustrated embodiments, method 100 determines to conditionally discharge the battery when the isolation integrity of external components is determined to be within the acceptable values or ranges at step 110.

By the steps such as 102, 106, 108 and 110, method 100 determines whether one or more of the batteries such as 12 or 14 is damaged, and whether a damaged battery may be discharged with relatively low hazard or risk. Although described in connection with certain steps 102, 106, 108 and 110, and in certain orders, in connection with FIG. 3, other embodiments of the method 100 include more or fewer such steps. Alternatively or additionally, in embodiments of the method 100 the steps such as 102, 106, 108 and/or 110 may be performed in different orders.

At step 112, method 100 performs a discharge mode operation on the potentially damaged battery such as 12 or 14. By the discharge mode operation step 112, method 100 causes the damaged battery to be coupled to a load. In embodiments, by the method 100 the damaged battery is coupled to the heater load 23 (FIG. 1). Alternatively or additionally, method 100 can cause the damaged battery to be coupled to one or more other accessories such as 20 of the electrical machine system 10 to perform the discharge mode operation step 112. In yet other embodiments (not shown), the electrical machine system 10 includes a discharge load (e.g., resistors) configured specifically for use with the discharge mode operation step 112, and method 100 additionally or alternatively causes the damaged battery to be coupled to the discharge load resistors. In preferred embodiments, the cell balancing resistors such as 80 (FIG. 2) are not used as loads in connection with performance of the discharge mode operation at step 112 (e.g., only loads external to the batteries such as 12 and 14 are used). However, in certain embodiments, the cell balancing resistors 80 may additionally or alternatively be used in connection with the discharge mode operation at step 112. In embodiments, by method 100 the discharge mode operation step 112 is performed automatically, and without being initiated by an operator, if a battery is determined to be potentially damaged and to present a relatively low hazard or risk by discharge as described above in connection with steps such as 102, 106, 108 and 110.

In embodiments, the damaged battery is discharged at step 112 to a level at which the battery can be accessed (e.g., removed from the electric machine system 10) and transported from the electric machine system with relatively low hazard or risk. For example, the damaged battery may be discharged to a non-zero level that is lower than the specified or nominal operating range of the battery during its charged state. In other embodiments, the damaged battery may be discharged at step 112 to a level close to zero volts. By step 112, the discharge rate of the damaged battery may be controlled. For example, the damaged battery may be coupled to a load configured to achieve a discharge rate that is low enough to keep internal heating of the battery to appropriate levels (e.g., to minimize heating), while enabling the battery to discharge within a reasonable period of time. The control parameters of the load may be fixed value, switchable between two or more fixed values, and/or continuously variable. Pulse width modulation (PWM) or other approaches may, for example, be used to control coupling of the damaged battery to the discharge load during the discharge mode operation step 112.

As shown by step 114, in certain embodiments of the method 100 an operator of the electrical machine system 10 may be notified, and/or operation of the machine system may be disabled, before the discharge mode operation at step 112 is performed. For example, by step 114 the electric motors 21 of the vehicle traction system 16 may be disconnected (e.g., locked-out) from the damaged battery to be discharged at step 112. In other embodiments, the electric motors 21 may be disconnected from all batteries such as 12 or 14 of the electric machine system 10 before performing the discharge mode operation at step 112. Similarly, one of more, or all of the vehicle accessories such as 20 may be disconnected from the damaged battery or all of the batteries before performing the discharge mode operation at step 112. The notifications of step 114 may be provided by a graphical, audio or other display (not shown in FIG. 1) of the electric machine system 10.

For example, a lamp or other graphical display may be provided to the vehicle operator to provide notice that the system is or will be operating in the discharge mode. The notice may, for example, be provided in advance or concurrently with the initiation of the discharge mode operation. Alternatively or in addition, a graphical display can be provided to the operator suggesting that any passengers exit the vehicle. In embodiments, the discharge mode operation is initiated and takes place automatically without operator interaction, and the operator may have no control or other capabilities to override the discharge mode operation. In other embodiments, the operator may be provided with notice (e.g., through a graphical interface) and/or control functionality that enables the operator to initiate and/or discontinue the discharge mode operation (e.g., in response to notice of the types described above). In these and other embodiments, the vehicle operator may be provided with notice, for example via a graphical interface, to turn the vehicle off and/or otherwise discontinue normal operation in advance of or when discharge mode operation is initiated. In other embodiments the vehicle is configured to automatically turn off or otherwise discontinue normal operation when the discharge mode operation is taking place.

At step 116, in certain embodiments of the method 100 an operator of the electrical machine system 10 may be notified, and/or operation of the machine system may be enabled, following the completion of the discharge mode operation at step 112. For example, by step 116, the method 100 may enable one or more others of the batteries 12 or 14 that were not discharged to be connected to the vehicle traction system 16 and/or to accessories such as 20. Alternatively or additionally, at step 116 method 100 may notify the operator of the electric machine system 10 that the damaged battery discharge step 112 is completed, and/or that the machine system may be enabled using others of the batteries 12 or 14.

Figure 4:
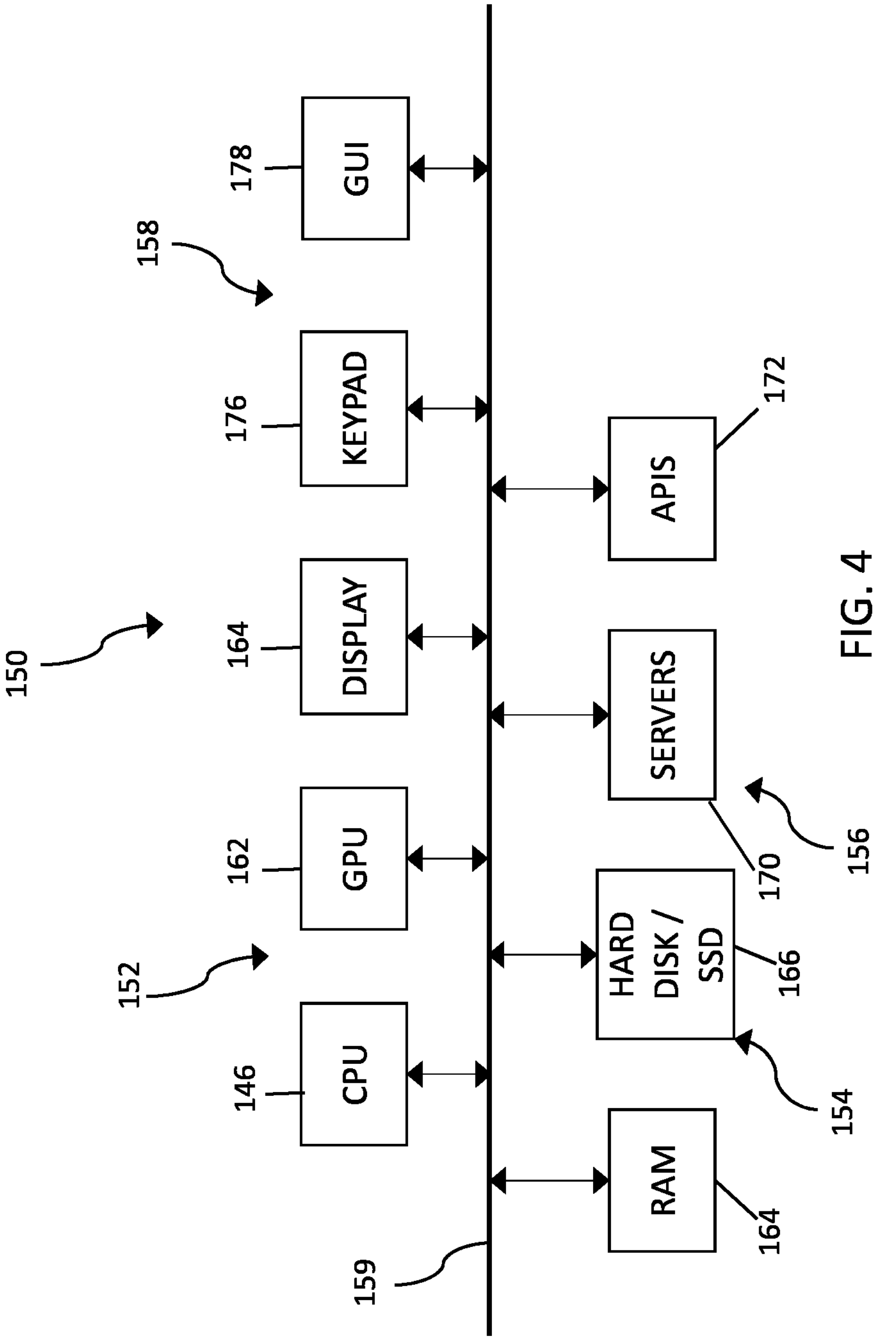
FIG. 4 is a diagrammatic illustration of a computer system that can be used to implement the battery discharge method shown in FIG. 2, in accordance with embodiments.

FIG. 4 is a diagrammatic illustration of an exemplary computer system 150 that may be used to implement components of the electrical machine system 10 such as controllers 34, 36, drive system controller 50, the vehicle system controller 52 and/or battery controller 72 in accordance with embodiments. The illustrated embodiments of computer system 150 comprise processing components 152, storage components 154, network interface components 156 and user interface components 158 coupled by a system network or bus 159. Processing components 152 may, for example, include central processing unit (CPU) 160 and graphics processing unit (GPU) 162, and provide the processing functionality of the electrical machine system 10 to perform the method 100. The storage components 154 may include RAM memory 164 and hard disk/SSD memory 166, and provide the storage functionality of the electrical machine system 10. For example, operating system software used by the processing components 152 and the software used by the processing components 152 to perform the methods such as 100 described herein may be stored by the storage components 154. In embodiments, the network interface components 156 may include one or more application programming interfaces (APIs) 172 (e.g., for coupling to components such as isolation monitors 30, 32, vehicle traction system 16, accessories 18, 20, BMUs 66 and pressure sensor 74). Examples of user interface components 158 include display 174 (e.g., for providing the notifications of method 100), keypad 176 and graphical user interface (GUI) 178. Embodiments of computer system 150 may include other conventional or otherwise known components to provide functionality in accordance with embodiments described herein.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in or associated with another embodiment. The scope of the invention should, therefore, be determined with reference to the appended claims, along with the full scope of equivalents to which such claims are entitled.

What is claimed is:

1. A computer-implemented method for operating an electrical machine system including one more batteries powering one or more electric machines, comprising:

receiving, by one or more processors, fault information representative of an isolation fault condition of a first of the one or more batteries;

receiving, by one or more processors, battery condition information representative of one or more electrical or mechanical or thermal conditions of the first battery, wherein the battery condition information is different than the fault information;

determining, by one or more processors in response to the isolation fault condition, whether to discharge the first battery based upon the battery condition information; and causing, by one or more processors, the first battery to operate in a discharge mode when it is determined to discharge the first battery.

2. The computer-implemented method of claim 1, wherein receiving the fault information includes receiving fault information representative of an isolation fault inside the first battery.

3. The computer-implemented method of claim 2, wherein the battery condition information includes information representative of one or more of coolant contamination, temperature, pressure or voltage.

4. The computer-implemented method of claim 1, wherein the battery condition information includes information representative of one or more of coolant contamination, temperature, pressure or voltage.

5. The computer-implemented method of claim 1, wherein determining whether to discharge the first battery includes determining, based upon the battery condition information, whether potentially hazardous battery discharge conditions exist.

6. The computer-implemented method of claim 5, wherein determining whether to discharge the first battery includes determining to not discharge the first battery when the battery condition information is representative of one or more of (1) no coolant contamination in the first battery, (2) a temperature of the first battery is representative of a potential thermal run-away condition, (3) a voltage of the first battery is representative of a potential over-discharge condition, or (4) a pressure or temperature of the first battery is representative of a potential fire.

7. The computer-implemented method of claim 1, wherein causing the battery to operate in the discharge mode comprises causing the battery to discharge to a level at which the battery can be accessed and transported without potential hazards.

8. The computer-implemented method of claim 1, wherein causing the first battery to operate in the discharge mode comprises causing the first battery to discharge to a level lower than a predetermined operating range of levels.

9. The computer-implemented method of claim 1, wherein:

the method further comprises receiving, by one more processors, isolation integrity information representative of isolation integrity of at least portions of the electrical machine system external to the first battery; and determining whether to discharge the first battery includes determining, by one or more processors in response to the isolation fault condition, whether to discharge the first battery based upon the battery condition information and the isolation integrity information.

10. The computer-implemented method of claim 9, wherein determining whether to discharge the first battery includes determining to not discharge the first battery when the isolation integrity information is representative of an isolation fault of the electrical machine system external to the first battery.

11. The computer-implemented method of claim 1, further comprising causing, by one or more processors, one or both of (1) a notification of the battery discharge mode operation to be presented to an operator of the machine system, or (2) disablement of the machine system, when it is determined to discharge the first battery.

12. The computer-implemented method of claim 11, further comprising causing, by the one or more processors, one or both of (1) a notification of completion of the battery discharge mode operation to be presented to an operator of the machine system, or (2) enablement of the machine system by one or more others of the one or more batteries, upon completion of the discharge mode operation for the first battery.

13. The computer-implemented method of claim 1, further comprising causing, by the one or more processors, one or both of (1) a notification of completion of the battery discharge mode operation to be presented to an operator of the machine system, or (2) enablement of the machine system by one or more others of the one or more batteries, upon completion of the discharge mode operation for the first battery.

14. The computer-implemented method of claim 1, wherein causing the first battery to operate in the discharge mode comprises causing the first battery to be coupled to a resistive load of the machine system external to the one or more batteries.

15. The computer-implemented method of claim 14, wherein causing the first battery to operate in the discharge mode comprises causing the first battery to be coupled to an accessory component of the machine system that has functionality in the machine system in addition to use during the discharge mode operation.

16. The computer-implemented method of claim 13, wherein the electric machine includes an electric motor.

17. The computer-implemented method of claim 16, wherein the electric machine is a traction motor of an electric vehicle.

18. The computer-implemented method of claim 17, wherein causing the first battery to operate in a discharge mode comprises causing the first battery to be coupled to an accessory component of the electric vehicle.

19. A computer system for operating an electric machine system including one or more batteries powering an electric machine:

one or more processors; and a program memory coupled to the one or more processors and storing executable instructions that when executed by the one or more processors cause the computer system to:

receive fault information representative of an isolation fault condition of a first of the one or more batteries;

receive battery condition information representative of one or more electrical or mechanical or thermal conditions of the first battery, wherein the battery condition information is different than the fault information;

determine, in response to the isolation fault condition, whether to discharge the first battery based upon the battery condition information; and causing the first battery to operate in a discharge mode when it is determined to discharge the first battery.

20. The computer system of claim 19, wherein receiving the fault information includes receiving fault information representative of an isolation fault inside the first battery.

* * * * *